April 2, 1946. W. H. BAILEY Re. 22,737

METHOD AND MACHINE FOR PROFILING MASSES OF MATERIAL

Original Filed March 1, 1940 5 Sheets-Sheet 1

Inventor
William H. Bailey,
By Dennis Edmunds Waters & Bowers
Attorneys

April 2, 1946. W. H. BAILEY Re. 22,737

METHOD AND MACHINE FOR PROFILING MASSES OF MATERIAL

Original Filed March 1, 1940 5 Sheets-Sheet 2

Inventor
William H. Bailey,
By Pennie Edmonds Morton Taussig
Attorneys

April 2, 1946. W. H. BAILEY Re. 22,737
METHOD AND MACHINE FOR PROFILING MASSES OF MATERIAL
Original Filed March 1, 1940 5 Sheets-Sheet 3
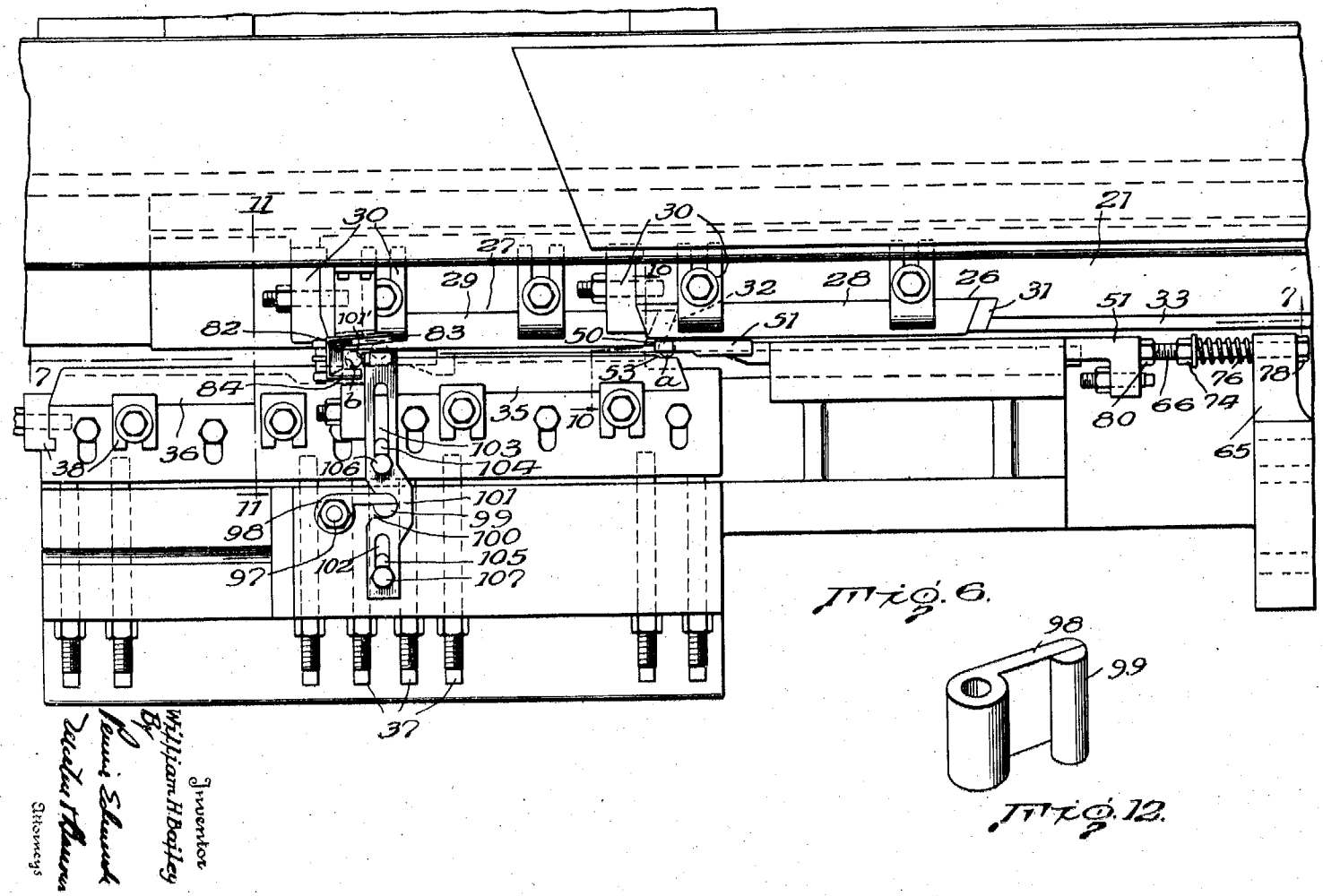

April 2, 1946. W. H. BAILEY Re. 22,737

METHOD AND MACHINE FOR PROFILING MASSES OF MATERIAL

Original Filed March 1, 1940 5 Sheets-Sheet 4

Inventor

William H. Bailey,

By Pennie Edmonds Morton & Barrows

Attorneys

April 2, 1946. W. H. BAILEY Re. 22,737
METHOD AND MACHINE FOR PROFILING MASSES OF MATERIAL
Original Filed March 1, 1940 5 Sheets-Sheet 5
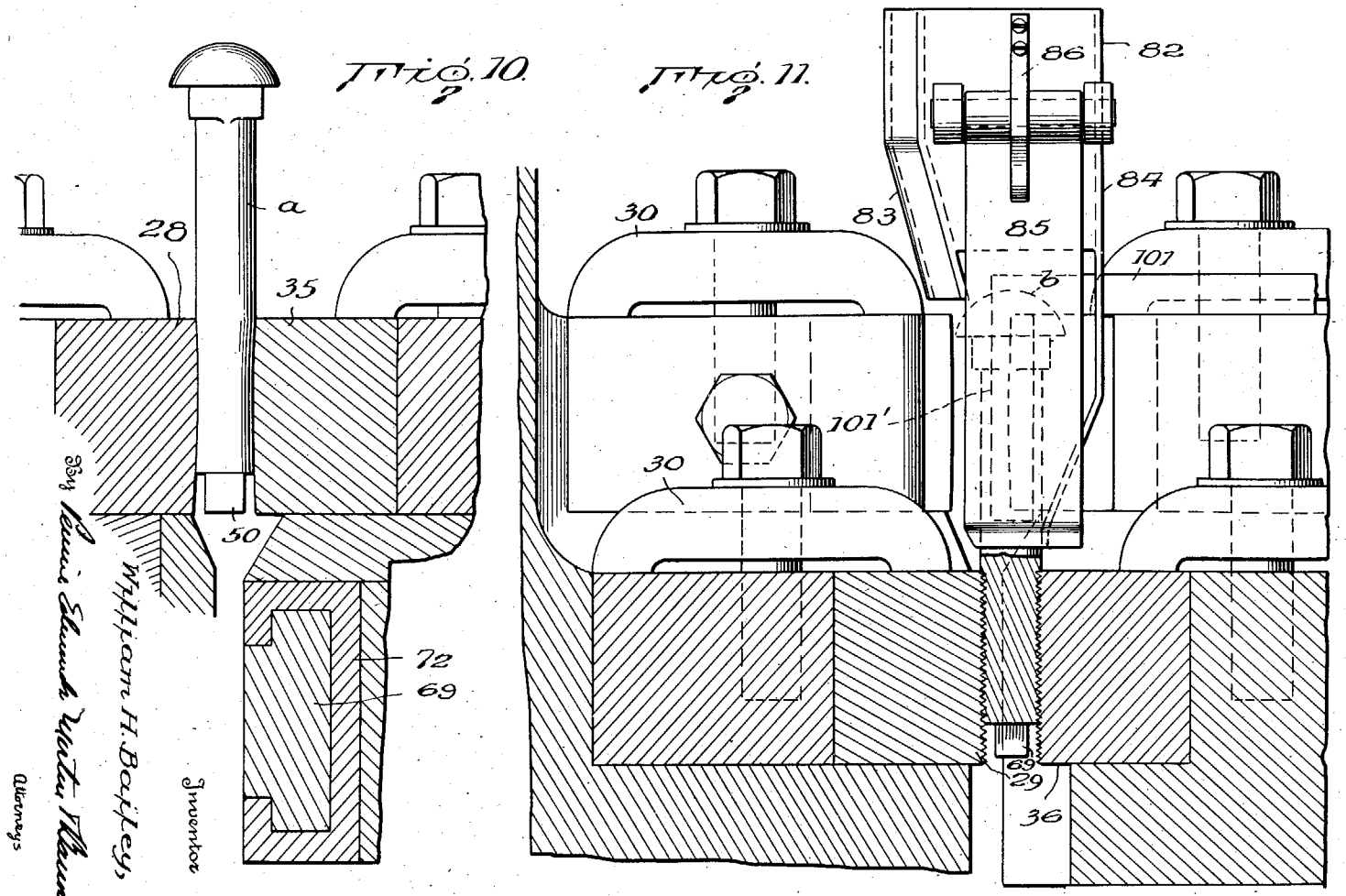
Inventor
William H. Bailey,
By Pennie Edmonds Morton Taussig
Attorneys Reissued Apr. 2, 1946

Re. 22,737

UNITED STATES PATENT OFFICE 22,737

METHOD AND MACHINE FOR PROFILING MASSES OF MATERIAL

William H. Bailey, Pueblo, Colo., assignor to The Colorado Fuel & Iron Corporation, Denver, Colo., a corporation of Colorado Original No. 2,317,244, April 20, 1943, Serial No. 321,798, March 1, 1940. Application for reissue April 18, 1944, Serial No. 531,621

45 Claims. (Cl. 80—8)

This invention relates to the production of desirable profiles upon a suitable mass of material by rolling such mass between one or more pairs of relatively movable dies. The invention will be particularly described in connection with the rolling of threads in bolt blanks, screw blanks and the like, but it is to be understood that in its broader aspects the invention is not limited to thread forming and that blanks for such purposes are only exemplary of masses which may have their profiles changed by rolling between relatively movable dies in accordance with my invention.

The present methods and machines for rolling masses between relatively movable dies are limited to the forming of screw threads on bolt blanks, screw blanks and the like. Such machines as heretofore have been proposed have been equipped with dies having thread-forming ridges and grooves. All other profiling has been done by some means other than rolling between relatively movable dies, as, for example, by forging, upsetting, heading or machining.

At the present time it is more or less standard practice to thread certain types of bolt blanks by causing the blank to be rolled under pressure between a pair of dies having thread-forming ridges and grooves of a shape to impart the desired thread form to the blank. One method now in extensive use for forming screw threads into blanks is to roll the blank between a single pair of relatively movable reciprocating platen dies having thread-forming ridges and grooves of a shape to impart the desired thread form to the blank. The part of the blank to be threaded is formed with a diameter slightly smaller than the diameter of the desired thread and, roughly, about equal to the pitch diameter of the thread to be formed. The reciprocating die on its forward stroke engages a bolt blank and causes it to roll along between the stationary and reciprocating dies until the end of the stationary die is reached, when the bolt with the thread formed thereon is ejected from the machine. The dies are set so that during the rolling of the blank it is subjected to a pressure sufficient to cause the thread forming ridges of the dies to sink or be embedded about half way into the blank, and the metal thus displaced to be forced to fill the grooves between the thread forming ridges. Such machines are automatic in operation and have means working in synchronism with the reciprocating die for feeding a bolt blank to be engaged and rolled between the threading dies on each forward movement of the reciprocating die, so that a blank is threaded and ejected from the machine on each reciprocation of that die.

Machines of the general type described above, while being simple in operation and producing threaded bolts at relatively low cost are not entirely satisfactory, and it is well known that the threaded portion of the bolts produced by them are neither truly cylindrical, nor truly circular in cross-section, with the result that nuts placed on such bolts do not uniformly fit the bolt threads. The dies exert a very substantial pressure at opposite sides of the blank, and as the thread-forming ridges are depressed into the blank the material is not only displaced so as to fill the grooves, but the pressure on the blanks results in a certain amount of longitudinal flow of the metal away from the central portion of the part being threaded, which longitudinal flow is greatest at the ends of the threaded portion because the least resistance to such flow is at the ends. That results in a finished bolt with threads of a smaller diameter at the ends than at the central portion.

As the threading dies of the present bolt threading machines engage only the opposite sides of the bolt blank and as the displacement of metal during the threading operation causes the portion of the blank being threaded to be subjected to very high pressures there is also a tendency, especially if the diameter of the blank is too large, for the metal of the blank to flow outwardly in the direction of the surface not engaged by the dies and the portion of the bolt being threaded to become out-of-round by reason of the pressure applied by the dies on the two sides of the bolt contacted at any specific instant.

The stresses set up in the bolt blank during the threading thereof, as described above, are so great that under certain circumstances the central portion of the blank becomes fractured, which, if severe enough, will mechanically produce a cavity or pipe and greatly weaken the bolt.

The matter of bolt and nut fit is becoming a subject of grave concern to the railroads and other users of bolts, as bolt failures are not infrequently due to imperfect or non-uniform fit of the nut.

By the present invention the disadvantages of the present methods and machines for rolling threads into bolt blanks and the like are overcome and a method and machine are provided which will produce screw threads which are uniform in pitch diameter, major and minor diameters, and thread profile, in the entire length of the threaded portion, so that bolt failures due to imperfect or non-uniform fit of the nut will be eliminated, or reduced to a minimum.

The present invention is adapted for either hot or cold rolling, and while it is primarily concerned with the threading of track bolts, such as are used in securing railroad rails and fish plates together, by means of cooperating stationary and reciprocating platen dies, it is applicable to the threading of bolts for other purposes. Also, the broad aspects of the invention are applicable to other types of thread-rolling machines.

Whereas the method of rolling threads into bolt blanks now in common use involves but a single operation on the cylindrical portion of the blank to be threaded, the present invention contemplates two operations on that portion of the bolt blank, in that before being acted upon by the threading dies the portion of the blank to be threaded is acted upon by one or more relatively movable initial or forming dies which correct the blank with reference to diameter and roundness and also preform the portion to be threaded, preferably by reducing the diameter of, and imparting a generally concave contour to that portion of the bolt blank. The blank with its concave contour and trued to proper size with regard to diameter is then subjected to the threading operation by rolling under pressure between one or more pairs of relatively movable dies. By reason of the fact that more metal is disposed at the end portions than at the central portions of the part of the blank to be threaded when it enters the threading or finishing dies, longitudinal flow or elongation, which is greatest at the end portions, is compensated for. Also by reason of the fact that the blank is trued to an exact diameter and concentricity no overfilled, underfilled or eccentric threads are produced. Thus the present invention, which comprises rolling the blank between pairs of relatively moving dies which preform and true the blank in addition to threading it, as distinguished from the present practice which is limited to threading the blank, fulfills the requirements necessary to produce an accurate screw thread, that is, disposition of metal in a manner to effect compensation for longitudinal flow or elongation at the ends, and truing for diameter and concentricity.

The present invention further provides for so preforming the blanks as they pass between the initial or forming dies that the body portion of the bolts and the like which are not threaded may be of the same diameter as the major diameter of the threaded portion; or such portion may be of greater, or of less diameter, as desired, than the major diameter of the threaded portion. That may be accomplished with the forming dies either by reducing a bolt blank having a diameter equal to the desired shank diameter, on its portion to be threaded, to the diameter required for rolling a full thread, or by reducing a bolt blank, having a diameter equal to the diameter required for rolling a full thread, on its shank portion to the desired diameter. Those operations can, of course, be made simultaneously with or before the truing up and the proper shaping of the part of the bolt blank to be threaded, or a blank can be reduced on the shank portion and on the portion to be threaded to the required size.

The extent of concavity imparted to the bolt blank is such that during the threading operation the blank is subjected to sufficient pressure to thoroughly consolidate the metal in the threads and to bring the central threads out into accurate longitudinal alignment with the end threads, without, however, causing the blank to be subjected to a pressure such as will cause the central threads to have a larger external diameter than the end threads, or such as will subject the central portion of the bolt to stresses such as will cause fracturing thereof.

The subjecting of the bolt blanks to the initial or forming dies to impart the concave shape thereto may be done before they are fed to the thread-forming machine, but preferably is done in the thread-forming machine and just before the bolt blank is passed into position to be engaged by the stationary and reciprocating threading dies, and also preferably by arranging the forming and threading dies in tandem. When the forming and threading dies are so arranged the bolt blanks may be fed to the forming dies in the same manner as they are now fed to the threading dies, and on each forward movement of the reciprocating die a blank will be trued and concaved by the forming dies and delivered to a position to be engaged and threaded by the threading dies on the next forward movement of the reciprocating dies, so that on each reciprocation of the reciprocating dies, after the first one, one bolt blank will be trued and concaved while the preceding blank will be threaded and ejected from the machine. Thus, while the present invention requires the performing of an additional operation on the bolt blank a bolt blank is threaded and ejected on each reciprocation of the reciprocating threading die, as in the present machines.

The invention will be further described in connection with the accompanying drawings in which a bolt threading machine of the reciprocating platen type is illustrated as an example of a machine for forming a desired profile on a mass of material. However, it is to be understood that such further illustration and further description is by way of exemplification and that the invention is not limited thereto, except to the extent set forth in the appended claims. In the drawings:

Fig. 1 is a plan view of a bolt threading machine embodying the present invention.

Fig. 6 is an enlarged plan view of that portion of the machine shown at the left hand side of Fig. 1.

Figure 10 is an enlarged transverse sectional view on line 10—10 of Fig. 6.

Fig. 11 is an enlarged transverse sectional view on line 11—11 of Fig. 6.

Fig. 12 is a perspective view of the flapper-actuating member.

Figures 5, 7:
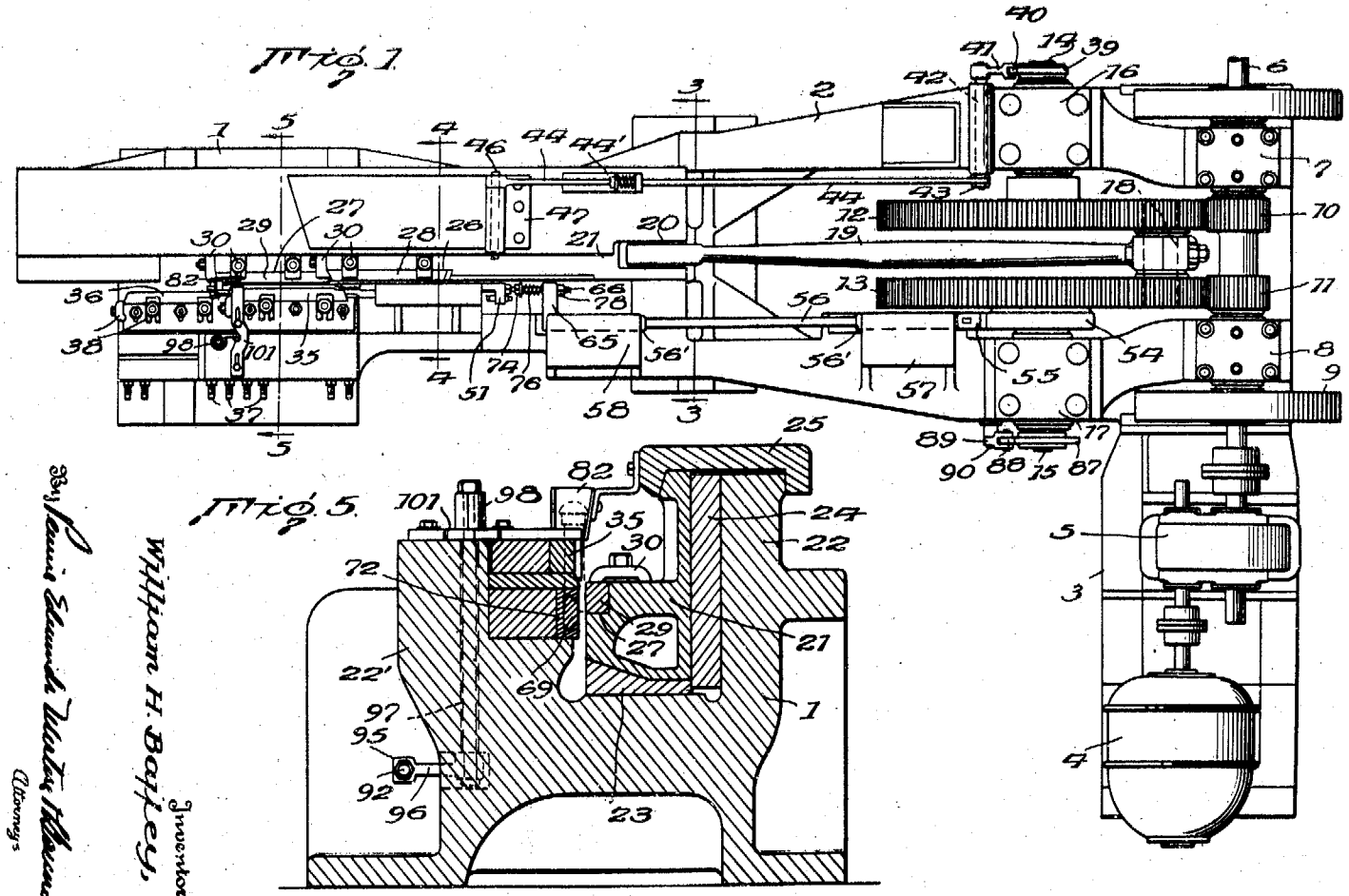
Fig. 5 is a transverse sectional view on line 5—5 of Fig. 1.
Fig. 7 is a longitudinal sectional view on line 7—7 of Fig. 6.

Referring to the drawings, the frame of the machine comprises a forward section 1, a rear section 2 and an angular extension 3 forming a support for an electric motor 4 or other source of power for driving the machine. The motor is connected through a gear transmission 5 to a shaft 6 supported in suitable bearings 7 and 8 on the rear part of section 2 of the frame. The shaft 6 carries flywheels 9 and a pair of small spur gears 10 and 11 meshing respectively with large spur gears 12 and 13 carried by the inner ends of a pair of aligned stub shafts 14 and 15 supported in bearings 16 and 17, also on section 2 of the frame. The large gears 12 and 13 are connected adjacent their outer edges by a crank pin 18 to which the rear end of a connecting rod 19 is connected.

The forward end of the connecting rod 19 is connected by a wrist pin 20 to a die block 21 mounted, as shown in Fig. 5, for reciprocation in a guideway provided by the base of the frame section 1 and an upright part 22 thereof. Suitable wear blocks 23 and 24 are positioned between the bottom and outer side of the die block 21 and the base frame member 1 and its upright extension 22, respectively. A cap plate 25 is secured over the upper edge of the upright extension 22, wear plate 24 and the upper edge of the die block 21, to complete the guideway for the reciprocating die block 21 and to hold it in proper position during reciprocation.

Die block 21 is provided with dovetailed recesses 26 and 27 for receiving a pair of dies 28 and 29 arranged in tandem and removably held within the recesses by clamps or hold-downs 30 bearing upon the upper edges and the outer end faces of the dies. Liners 31 and 32 are interposed between the rear ends of the dies 28 and 29 and the rear ends of recesses 26 and 27, and wear plates 33 and 34 are secured to the inner side of the die block behind the liners 31 and 32 respectively.

The reciprocating dies 28 and 29 cooperate with a pair of stationary dies 35 and 36, also arranged in tandem and adjustably secured to the inner side of an upright portion 22′ of the frame section 1 by stop screws 37. The dies 35 and 36 are held in their adjusted position by clamps or hold-downs 38 bearing upon their upper edges and their outer ends.

The reciprocating die 28 and the stationary die 35 with which it cooperates are initial forming or shaping dies shaped so that as a bolt blank passes between them in the manner hereinafter described the portion thereof to be threaded will be concaved or otherwise shaped. The reciprocating die 29 and the stationary die 36 with which it cooperates are threading dies and are provided with the usual inclined threading ridge to impart a thread to the previously shaped bolt blank when it is rolled between those dies.

For operating the mechanism for feeding bolt blanks to the forming dies, the outer end of the stub shaft 14 has a cam 39 rigidly secured thereto and rotating against a roller 40 mounted in the lower end of a downwardly-extending rocker arm 41 rigidly secured to the outer end of a rocker shaft 42. The inner end of the rocker shaft 42 has an upwardly-extending rocker arm 43 to which is connected a link 44 slidable through a guide bracket or the like 44′ secured on the frame section 1. The forward end of the link 44 is connected to the lower end of a rocker arm 45 rigidly secured to a rocker shaft 46 mounted in a bracket 47 secured to the frame section 1. The upper end of the rocker arm 45 is connected through links 48 to a series of slides 49 which control the feeding of bolt blanks from a feed chute to the point *a* in Figs. 6 and 8 where they rest upon a forwardly-projecting toe piece 50 of a starter 51, and in position to be pushed between the initial forming dies 28 and 35 as the former begins its forward movement.

The feed chute for the bolt blanks to be threaded and the details of the mechanism for feeding the bolt blanks to the position *a* is not shown, as such mechanisms are well known and form no part of the present invention. It is sufficient to point out that the operation of the slides 49 in the manner above described is synchronized with the reciprocation of the die block 21 and dies 28 and 29 carried thereby so that one bolt blank is fed to the position *a* for each reciprocation of the dies 28 and 29, and at the proper time to be pushed between the initial forming dies 28 and 35 at the beginning of the forward movement of the die 28.

The rear end of the face of the stationary forming die 35 is cut back to form a sloping shoulder 53 for temporarily retaining a bolt blank at *a* in proper position. The rear end of the face of the threading die 36, likewise, is cut back to form a sloping shoulder 53′ for temporarily retaining a previously concaved bolt blank in the position *b*, ready to be pushed between the threading dies 29 and 36 as the former begins its forward movement.

In order to operate the starters for pushing the bolt blanks between the forming dies 28 and 35 and the threading dies 29 and 36, a cam 54 is rigidly secured to the stub shaft 15 between the large gear 13 and the shaft bearing 17 and rotates against a clevis block 55 secured to the rear end of a starter actuating rod 56 having bearing blocks 56′ rigidly secured thereto and slidable in bearings 57 and 58 in the frame sections 2 and 1, respectively. Actuating rod 56 has a boss 59 formed on the lower side thereof intermediate its ends for slidably receiving a rod 60, the forward end of which is provided with a nut 62 forming a bearing for the forward end of a compression spring 63, the other end of which bears against the forward face of the boss 59 on the rod 56. The rear end of the rod 60 which extends through the bracket 61 has a nut 64 threaded thereon so that the force exerted by the spring 63 against the boss 59 may be adjusted. The spring 63 bearing against the boss 59 on rod 56 yieldingly maintains the clevis block 55 secured to the end of the rod 56 in contact with the periphery of the cam 54, and tends to restore the rod 56 to its rearmost position after the high point on the cam has passed the clevis block 55.

Figures 2, 3, 4:
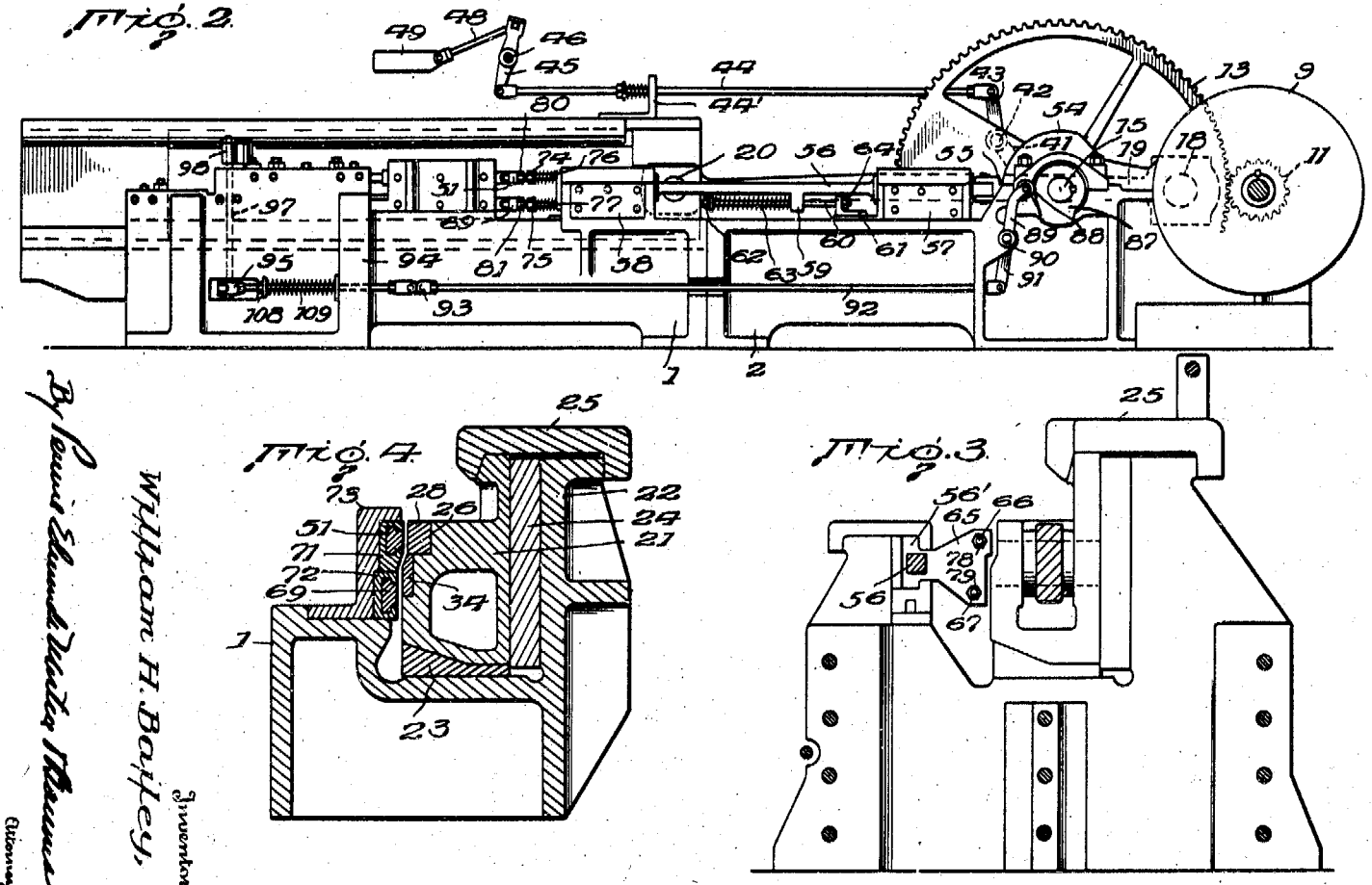
Fig. 2 is a side elevational view.
Fig. 3 is a transverse sectional view taken on line 3—3 of Fig. 1.
Fig. 4 is a transverse sectional view on line 4—4 of Fig. 1.
Figure 7:
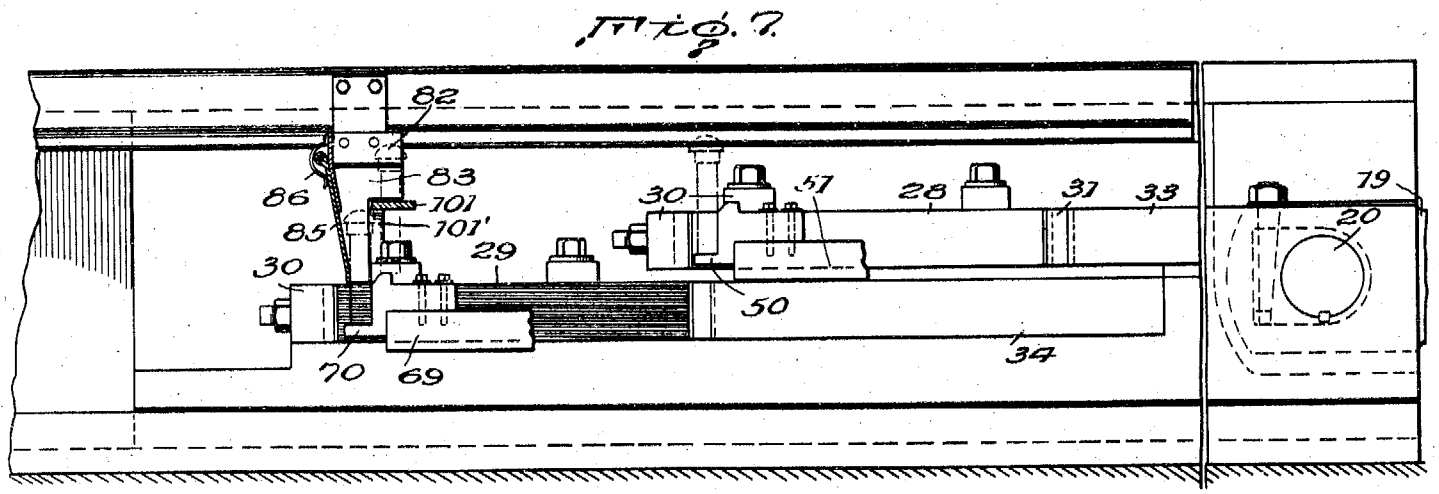

As shown in Figs. 1 and 3, the forward end of the bearing block 56′ has an angular extension 65 through which a pair of rods 66 and 67 are slidable. The forward end of the rod 66 is threaded into the rear end of the starter 51. The forward end of the rod 67 is threaded into the rear end of a similar starter 69 located in a horizontal plane below the starter 51 and having a toe piece 70 for receiving the end of a bolt in position *b*, Figs. 6 and 8. As shown in Fig. 4 the starters 51 and 69 are slidable in bearing blocks 71 and 72 mounted within an upright extension 73 secured to frame section 1.

Nuts 74 and 75 are threaded onto the rods 66 and 67 between the angular extension 65 and the rear face of the starters 51 and 69 and form bearing surfaces for the forward ends of compression springs 76 and 77 respectively. The rear ends of the compression springs bear against the forward face of the angular extension 65. Nuts 78 and 79 are threaded onto the rear ends of the rods 66 and 67 which extend through the angular extension 65. Lock nuts 80 and 81 are threaded onto the forward ends of the rods 66 and 67 and bear against the rear face of the starters 51 and 69. By suitably adjusting the nuts 74 and 75 and the nuts 78 and 79 the proper position of the toe pieces 50 and 70 of the starters 51 and 69, respectively, and the tension of the springs 76 and 77, may be adjusted. The springs 76 and 77 form resilient actuating means for the starters 51 and 69.

As best shown in Figs. 6 and 7, a bolt blank receiving hopper 82 is positioned to receive the bolt blanks at the end of the first pass after they have been rolled between the initial forming dies 28 and 35. The hopper is generally U-shaped in horizontal cross-section and comprises downwardly and inclined side walls 83 and 84 and a downwardly and inwardly sloping end gate 85 normally held by a leaf spring 86 in a position to close the space between the forward ends of the side walls 83 and 84. The rear side of the hopper is open to receive bolt blanks at the end of the first pass.

The outer end of the stub shaft 15 has a cam 87 rigidly secured thereto and rotating against a roller 88, mounted in the upper end of a rocker arm 89 rigidly secured to the outer end of a rocker shaft 90. A rocker arm 91 is rigidly secured to the inner end of the rocker shaft 90 and has its lower end connected to a connecting rod 92, the length of which may be adjusted by a turn buckle or the like 93. The forward end of the connecting rod 92 passes through one of a series of reinforcing webs 94 of the frame section 1 and has a clevis 95, adjustably secured thereto and connected to the free end of a rocker arm 96 rigidly secured to the lower end of a vertical shaft 97 extending upwardly through the frame section 1 to a point above the top surface thereof. A flapper-actuating member 98 is rigidly secured to the upper end of the rocker shaft 97 and has a cylindrical outer end portion 99 received within a slot 100 formed in a flapper 101 slidable along the upper surface of the frame section 1 and having longitudinally extending slots 102 and 103 within which are positioned blocks 104 and 105 rigidly secured to the top surface of the frame section 1 by bolts 106 and 107 respectively. The blocks 104 and 105 guide the flapper 101 during its actuation by the actuating member 98. The flapper bar 101 has on its inner end a projection 101' extending down to the bottom of the hopper 82. When the flapper bar is actuated, this projection opens and closes the rear side of the hopper 82.

A nut 108 is adjustably secured to the connecting rod 92 between the reinforcing web 94 and the clevis 95 and forms a bearing for the outer end of a compression spring 109, the inner end of which bears against the reinforcing web 94 of the frame. The compression spring 109 exerts a force normally tending to move the connecting rod 92 to the left in Fig. 2, thereby to maintain the roller 88 constantly in engagement with the periphery of the cam 87.

As the machine operates, the rotation of cam 87 causes the flapper bar 101 to be reciprocated back and forth and the actuating mechanism is so constructed that the movement of the flapper bar is synchronized with the reciprocation of the forming die 28 and moves to its inner position to close the rear of the hopper 82 just after a bolt blank has been ejected from between the forming dies 28 and 35 into the hopper 82.

Figure 8:
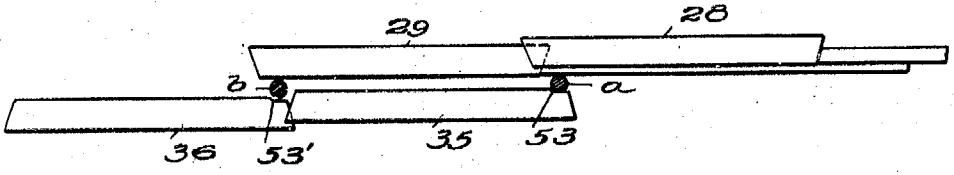
Fig. 8 is a diagrammatic view illustrating the position of the dies and a pair of bolt blanks at the beginning of a stroke.
Figure 9:
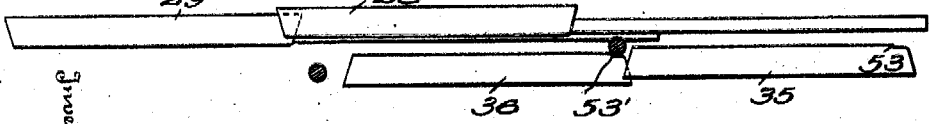
Fig. 9 is a diagrammatic view illustrating the position of the dies and a pair of bolt blanks an the end of a stroke.

In the operation of the machine a bolt blank to be threaded is fed from the feed chute to position *a*, Figs. 6 and 8, where it is received by the toe piece 50 of the starter member 51. As the die block 21 carrying the dies 28 and 29 moves forward, the starter member 51 is pushed forward and forces the bolt blank along the inclined shoulder 53 of the stationary die 35 into a position where the opposite sides thereof are engaged by the forming dies 28 and 35. The forward movement of the reciprocating die 28 causes the bolt to be rolled under pressure between it and the stationary die 35 until it reaches the forward end of the latter. The bolt blank with the portion to be threaded, concaved as shown in Fig. 10, is then ejected from between the forming dies 28 and 35 and passes into hopper 82 through which it drops to the lower level of the cooperating threading dies 29 and 36. The bolt is then in position *b*, shown in Fig. 8. As soon as the concaved bolt blank passes into the hopper the flapper bar 101 is moved to its innermost position to close the rear side of the hopper 82, as shown in Fig. 6. On the next forward movement of the die block 21, the bolt blank, with the portion thereof to be threaded concaved, is forced by the pusher member 69 along the sloping shoulder 53' of the stationary die 36 to bring the bolt blank into a position to be engaged on opposite sides by the cooperating threading dies 29 and 36. The forward movement of the die 29 causes the threads to be rolled into the bolt blank in a well-known manner. At the end of the forward movement of the die 29 the bolt properly threaded is ejected from the machine.

From the foregoing description it will be seen that during the first pass the portion of the bolt blank which is acted upon by the initial forming dies 28 and 35, that is, the portion of the blank which is subsequently to be threaded, is given a concaved contour. During the second pass the thread is rolled into the bolt blank in the usual manner. However, as the portion of the bolt blank to be threaded has been given a concave shape the larger diameter at the ends compensate for the flow of metal in the longitudinal direction of the blank away from the central portion to be threaded, and a bolt with a thread of uniform diameter results. The extent of the concavity imparted to the bolt blank during the first pass is such that during the threading operation, which takes place during the second pass, the blank is subjected to a sufficient pressure to thoroughly consolidate the metal in the threads and to bring the central threads out into accurate longitudinal alignment with the end threads, without having caused the portion of the blank being threaded to be subjected to a pressure which will cause the bolt being threaded to be forced out of round, or the central threads to have a larger external diameter than the end threads, as is common with bolts having threads rolled therein by a single operation and without any initial concaving of that portion of the blank which is to be threaded.

The initial forming dies 28 and 35 may have smooth faces or faces provided with ridges and grooves to partially form the desired thread before the blanks are passed to the dies 29 and 36. In the latter case the initial forming dies 28 and 35 will perform the dual function of preforming the bolt blank so that the portion thereof to be threaded has a generally concave contour and of imparting a partially formed thread to be completed by the finishing dies 29 and 36.

While the present method of rolling threads into bolt blanks necessitates an additional operation upon that portion of the bolt blank which is to be threaded, that is not a disadvantage, because on each reciprocation of the movable dies one bolt blank has the portion to be threaded given a concave contour while the preceding bolt blank is being threaded. Thus the present machine causes a bolt blank to be threaded for each reciprocation of the movable dies, as in present machines.

A machine embodying the present invention has been described with respect to preliminarily giving the blanks a general concave form prior to rolling it to develop a thread thereon. However, it is understood that the invention also contemplates machines in which the blanks are preliminarily rolled merely to bring them to proper cylindrical shape and size preparatory to the rolling of a thread in them.

I claim:

1. The method of imparting a non-linear profile longitudinally of a generally cylindrical mass of material which comprises forming an intermediate portion of that part of the mass of material which is to be profiled so that the area of a cross-section normal to the length of the mass of material at said intermediate portion is less than the area of a like cross-section at the end portions of said part of the mass of material, and pressing the desired non-linear profile into that part of the mass of material which is to be profiled while said intermediate portion has a less cross-sectional area than said end portions, the shape of the profiling member, its relation during the pressing operation to the mass of material and the pressure under which the pressing of the profile into the mass of material takes place being such that material in said intermediate and end portions of the part of the mass of material being profiled is brought into longitudinal alignment.

2. The method of imparting a non-linear profile longitudinally of a generally cylindrical mass of material which comprises forming an intermediate portion of that part of the mass of material which is to be profiled so that there is a less volume of material there than at the end portions of said part of the mass of material, and rolling the desired non-linear profile into that part of the mass of material which is to be profiled, while there is a less volume of material at said intermediate portion than there is at said end portions, between platen dies to impart the desired profile thereto, the pressure under which the mass of material is rolled being such that material in said intermediate portion is forced outwardly sufficiently to bring its profiled surface into alignment with the profiled surface at the end portions of said part of the mass of material.

3. The method of imparting a non-linear profile longitudinally of a generally cylindrical mass of material which comprises forming an intermediate portion of that part of the mass of material which is to be profiled with a smaller diameter than the end portions of said part of the mass of material; and rolling the desired non-linear profile into that part of the mass of material which is to be profiled while said intermediate portion is of smaller diameter than said end portions, the shape of the profile-forming member, its relation during the rolling operation to the mass of material and the pressure under which rolling of the profile into the mass of material takes place being such that material in said intermediate portion is forced outwardly sufficiently to bring its profiled surface into alignment with the profiled surface at the end portions of said part of the mass of material.

4. The method of preventing the formation of a non-uniform-diameter profile as the result of working a uniform diameter blank which comprises forming the major portion of the part of the blank which is to be profiled, including the central portion thereof, with a generally concaved contour, and pressing the desired profile into that part of the blank which is to be profiled, the shape of the profile-forming member, its relation during the pressing operation to the blank and the pressure under which the pressing of the profile into the blank takes place being such that material in said central portion is forced outwardly sufficiently to bring its profiled surface into alignment with the profiled surface at the end portions of said part of the blank.

5. The method of profiling a generally cylindrical blank which comprises imparting a concaved contour to the major part of that portion of the blank which is to be profiled, and rolling the desired profile into said portion of the blank, the shape of the profile-forming member, its relation during the rolling operation to the blank, and the pressure under which the rolling of the profile into the blank takes place being such that material in said concaved portion is forced outwardly sufficiently to bring its profiled surface into longitudinal alignment.

6. The method of profiling a generally cylindrical blank which comprises preforming the entire part of the blank which is to be profiled so that it is of generally concave contour, and pressing the desired profile into the part of the blank of generally concave contour, the shape of the profile-forming member, its relation during the pressing operation to the blank and the pressure under which the pressing of the profile into the blank takes place being such that material in said intermediate portion is forced outwardly sufficiently to bring its profiled surface into longitudinal alignment with the profiled surface at the end portions of said part of the blank.

7. The method of imparting a cylindrical thread to a bolt blank which comprises forming an intermediate portion of that part of the bolt blank which is to be threaded so that there is a less volume than at the end portions of said part of the bolt blank, and pressing a thread into that part of the bolt blank which is to be threaded, the shape of the thread-forming member, its relation during the pressing operation to the bolt blank and the pressure under which the pressing of the thread into the bolt blank takes place being such that the threads formed in said intermediate and end portions of the part of the blank being threaded are brought into longitudinal alignment.

8. The method of imparting a cylindrical thread to a bolt blank which comprises forming an intermediate portion of that part of the bolt blank which is to be threaded so that there is a less volume of material there than at the end portions of said part of the bolt blank, and pressing a thread into that part of the bolt blank which is to be threaded, the shape of the thread-forming member, its relation during the pressing operation to the bolt blank and the pressure under which the pressing of the thread into the bolt blank takes place being such that material in said intermediate portion is forced outwardly sufficiently to bring the threads formed in said intermediate portion into longitudinal alignment with the end threads.

9. The method of imparting a cylindrical thread to a bolt blank which comprises forming an intermediate portion of that part of the bolt blank which is to be threaded so that there is a less volume of material there than at the outer or free end portion of said part of the bolt blank, and rolling a thread into that part of the bolt blank which is to be threaded, the shape of the thread-forming member, its relation during the rolling operation to the bolt blank and the pressure under which the rolling of the thread into the bolt blank takes place being such that material in said intermediate portion is forced outwardly sufficiently to bring the threads formed in said intermediate portion into longitudinal alignment with the threads formed at the outer or free end portion of said part of the bolt blank.

10. The method of imparting a cylindrical thread to a bolt blank which comprises forming an intermediate portion of that part of the bolt blank which is to be threaded with a smaller diameter than the end portions of said part, and rolling a thread into that part of the bolt blank which is to be threaded, the shape of the thread-forming member, its relation during the rolling operation to the bolt blank and the pressure under which the rolling of the thread into the bolt blank takes place being such that material in said intermediate portion is forced outwardly sufficiently to bring the threads formed in said intermediate portion into longitudinal alignment with the end threads.

11. The method of imparting a cylindrical thread to a bolt blank which comprises preforming the entire part of the bolt blank to be threaded so that the intermediate portion of that part of the bolt blank is of a smaller diameter than the end portions of said part of the bolt blank, and rolling a thread into that part of the bolt blank which is to be threaded, the shape of the thread-forming member, its relation during the rolling operation to the bolt blank and the pressure under which the rolling of the thread into the bolt blank takes place being such that material in said intermediate portion is forced outwardly sufficiently to bring the threads formed in said intermediate portion into longitudinal alignment with the end threads.

12. The method of imparting a cylindrical thread to a bolt blank which comprises forming the central portion of that part of the bolt blank which is to be threaded with a smaller diameter than the end portions of the part of the bolt blank to be threaded, and pressing a thread into that part of the bolt blank which is to be threaded, the shape of the thread-forming member, its relation during the pressing operation to the bolt blank and the pressure under which the pressing of the thread into the bolt blank takes place being such that material in said central portion is forced outwardly sufficiently to bring the threads formed in said central portion into longitudinal alignment with the end threads.

13. The method of imparting a cylindrical thread to a bolt blank which comprises forming the central portion of that part of the bolt blank which is to be threaded with a smaller diameter than the outer or free end portion of the part of the bolt blank to be threaded, and rolling a thread into that part of the bolt blank which is to be threaded, the shape of the thread-forming member, its relation during the rolling operation to the bolt blank and the pressure under which the rolling of the thread into the bolt blank takes place being such that material in said central portion is forced outwardly sufficiently to bring the threads formed in said central portion into longitudinal alignment with the threads at the outer or free end portion of said part of the bolt blank.

14. The method of imparting a cylindrical thread to a bolt blank which comprises imparting a generally concaved contour to that portion of the bolt blank which is to be threaded, and rolling a thread into said portion of the bolt blank, the shape of the thread-forming member, its relation during the rolling operation to the bolt blank and the pressure under which the rolling of the thread into the bolt blank takes place being such that material in said concaved portion is forced outwardly sufficiently to bring the threads formed therein into longitudinal alignment.

15. The method of imparting a cylindrical thread to a bolt blank which comprising forming the central portion of that part of the bolt blank which is to be threaded with a smaller diameter than the end portions, and rolling the portion of the bolt blank to be threaded between thread-forming dies which engage opposite sides of the bolt blank, the shape of the thread-forming dies, their relation during the rolling operation to the bolt blank and the pressure under which the rolling of the thread into the bolt blank takes place being such that material in said central portion is forced outwardly sufficiently to bring the threads formed in said central portion into longitudinal alignment with the end threads.

16. The method of imparting a cylindrical thread to a bolt blank which comprises simultaneously forming an intermediate portion of that part of the bolt blank which is to be threaded with a smaller diameter than the end portions and with a partially formed thread, and thereafter rolling the portion of the bolt blank to be threaded under pressure between finishing dies which complete the formation of the thread on that part of the bolt blank to be threaded, the shape of the finishing dies, their relation during the rolling operation to the bolt blank and the pressure under which the formation of the threads is completed being such that as the formation of the threads in said intermediate portion is being completed the material in said intermediate portion is forced outwardly sufficiently to bring them into longitudinal alignment with the end threads.

17. The improvement in the method of threading a bolt blank in which the part of the bolt blank to be threaded is engaged on opposite sides by grooved thread-forming dies and the bolt blank is rolled between said dies to form the thread thereon, which comprises first engaging the end portions of the part of the blank to be threaded with the thread-forming dies so that longitudinal flow of the material due to the threading operation is away from the middle of the portion being threaded and the grooves of those portions of the threading dies which lie opposite the central part of the portion of the blank being threaded are progressively filled.

18. The improvement in the method of threading a bolt blank in which the part of the bolt blank to be threaded is engaged on opposite sides by grooved thread-forming dies and the bolt blank is rolled between said dies to form the thread thereon, which comprises forming an intermediate portion of that part of the bolt blank which is to be threaded with a smaller diameter than the end portions of said part and first engaging the end portions of said part of the bolt blank with the thread-forming dies so that longitudinal flow of material due to the threading operation is away from the middle of the portion being threaded and the grooves of those portions of the threading dies which lie opposite the central part of the portion of the blank being threaded are progressively filled.

19. A machine for profiling a mass of material which comprises means for preforming an intermediate portion of that part of the mass of material to be profiled so that there is less volume of material there than at the end portions of said part, a finishing die having a planar thread-forming face, means for feeding the preformed mass of material to said finishing die, and means for pressing said finishing die against the mass of material with the planar thread-forming face thereof bridging said intermediate portion of less volume and with a force sufficient to cause material in said intermediate portion to be forced outwardly sufficiently to bring said intermediate portion into longitudinal alignment with the end portions of said part of the mass of material.

20. A machine for profiling a mass of material which comprises means for preforming the part of the mass of material to be profiled so that an intermediate portion of the part thereof to be profiled is of smaller diameter than the end portions of said part, a finishing die having a planar thread-forming face, means for feeding the preformed mass of material to said finishing die, and means for pressing said finishing die against said mass of material with the planar face thereof bridging said intermediate portion of smaller diameter and with a force sufficient to cause material in said intermediate portion to be forced outwardly sufficiently to bring said intermediate portion into longitudinal alignment with the end portions of said part of the mass of material.

21. A machine for profiling a mass of material which comprises a pair of relatively movable finishing dies adapted to engage a blank and to roll a desired profile thereon, a pair of relatively movable preforming dies positioned to the rear of said finishing dies for rolling blanks between them and imparting to an intermediate portion of said blanks a smaller diameter than the end portions of said parts of the blanks, and means for feeding preformed blanks from said preforming dies to said finishing dies.

22. A machine for forming cylindrical threads on a bolt blank which comprises means for preforming an intermediate portion of that part of the blank which is to be threaded so that there is a less volume of material there than at the end portions of said part, a threading die having a planar thread-forming face, means for feeding the preformed bolt blank to said finishing die, and means for pressing said finishing die against the part of the blank to be threaded with the planar face thereof in parallelism with the axis of the blank and with a force sufficient to form threads therein and to cause material in said intermediate portion to be forced outwardly sufficiently to bring the threads formed at said intermediate portion into longitudinal alignment with the end threads.

23. A machine for threading bolt blanks which comprises a pair of relatively movable thread-forming dies adapted to engage a bolt blank to form a finished thread thereon, a pair of relatively movable preforming dies positioned in advance of said finishing dies to engage the opposite sides of a bolt blank to be threaded and simultaneously to form an intermediate portion of the part of the bolt blank to be threaded with a smaller diameter than the end portions of said part and with a partially formed thread, and means for feeding bolt blanks from said preforming dies to said finishing dies where the thread on the bolt blank is completed as said finishing dies move relative to one another.

24. A machine for forming cylindrical threads on a bolt blank which comprises means for preforming an intermediate portion of the part of the bolt blank to be threaded with a smaller diameter than the end portions of said part, a reciprocating die having a substantially planar thread-forming face, means for bringing the preformed blank into engagement with said thread-forming die with the axis of the blank parallel to the planar thread-forming face of said reciprocating die and means for pressing the die against the portion of the preformed blanks to be threaded with the planar thread-forming face thereof bridging said intermediate portion of smaller diameter and with a force sufficient to form threads therein and to cause material in said intermediate portion to be forced outwardly sufficiently to bring the threads formed at said intermediate portion into longitudinal alignment with the end threads.

25. A machine for forming cylindrical threads on a bolt blank which comprises a stationary die having a planar thread-forming face, a reciprocating die for cooperation with said stationary die having a planar thread-forming face parallel with the planar thread-forming face of the stationary die, said dies being adapted to engage opposite sides of a bolt blank and to cause threads to be rolled into it; means for imparting a generally concaved contour to that portion of the bolt blanks which are to be threaded, and means for feeding such preformed blanks between said stationary and reciprocating dies with the concaved portions opposite said dies.

26. A machine for profiling a blank which comprises a pair of preforming dies for engaging opposite sides of blanks and reducing the diameter of the central portion of those parts of the blanks which are to be profiled, a pair of finishing dies, means for feeding blanks to said preforming dies, means for feeding preformed blanks from said preforming dies to said finishing dies, and means for causing said finishing dies to engage opposite sides of the blanks to roll the desired profile into them and to cause the central portion of reduced diameter to be forced outwardly into longitudinal alignment with the adjacent profiled portions.

27. A machine for imparting a cylindrical thread to bolt blanks which comprises a pair of forming dies for engaging opposite sides of bolt blanks and reducing the diameter of the central portion of those parts of the blanks which are to be threaded, a pair of threading dies, means for feeding bolt blanks to said forming dies, means for feeding the bolt blanks from said forming dies to said threading dies, and means for causing said threading dies to engage opposite sides of the blanks to roll a desired thread into them and to cause material in said central portion of reduced diameter to be forced outwardly sufficiently to bring the threads formed in said central portions into longitudinal alignment with the end threads.

28. A machine for imparting a cylindrical thread to bolt blanks which comprises a pair of forming dies for engaging opposite sides of bolt blanks and reducing the diameter of the central portion of those parts of the blanks which are to be threaded, a pair of threading dies, means for feeding bolt blanks to said forming dies, means for feeding the bolt blanks from said forming dies to said threading dies, and means for causing said threading dies to engage opposite sides of the blanks to roll a desired thread into them, and to cause material in said central portion of reduced diameter to be forced outwardly sufficiently to bring the threads formed in said central portions into longitudinal alignment with the end threads, said threading and forming dies being arranged in tandem.

29. A machine for threading bolt blanks which comprises a pair of forming dies for engaging opposite sides of bolt blanks and imparting a generally concave contour to the portions thereof which are to be threaded, one of said forming dies being stationary, means for reciprocating the other of said forming dies, a pair of thread-forming dies having planar thread-forming faces, one of said threading dies being stationary, means for reciprocating the other of said threading dies, means for feeding bolt blanks to said forming dies, means for feeding the bolt blanks from said forming dies to said threading dies, and means for causing the planar thread-forming faces of the finishing dies to engage opposite sides of the concaved portions of the blanks, while in substantial parallelism with the axes of the blanks, to roll the desired thread in the concaved portions thereof under a pressure sufficient to cause material in said concaved portions to be forced outwardly sufficiently to bring the threads being formed in said portions into longitudinal alignment.

30. A machine for threading bolt blanks which comprises a pair of forming dies for engaging opposite sides of bolt blanks and imparting a generally concave contour to the portions thereof which are to be threaded, one of said forming dies being stationary, means for reciprocating the other of said forming dies, a pair of thread-forming dies for engaging opposite sides of bolt blanks and causing threads to be rolled in them, one of said threading dies being stationary, means for reciprocating the other of said threading dies, means for feeding bolt blanks to said forming dies, and means for feeding the bolt blanks from said forming dies to said threading dies, said forming and threading dies being arranged in tandem.

31. A machine for threading bolt blanks which comprises a pair of stationary dies, a pair of reciprocating dies, common means for reciprocating said reciprocating dies, one of said stationary dies and one of said reciprocating dies being forming dies cooperating one with the other and shaped to impart a generally concaved contour to those portions of the bolt blanks which are to be threaded, the other of said stationary dies and the other of said reciprocating dies cooperating one with the other and having thread-forming faces for engaging opposite sides of bolt blanks, means for feeding bolt blanks to said forming dies and means for feeding bolt blanks from said forming dies to said threading dies.

32. A machine for threading bolt blanks which comprises a pair of stationary dies, a pair of reciprocating dies, common means for reciprocating said reciprocating dies, one of said stationary dies and one of said reciprocating dies being forming dies cooperating one with the other and shaped to impart a generally concave contour to those portions of the bolt blanks which are to be threaded, the other of said stationary dies and the other of said reciprocating dies cooperating one with the other and having thread-forming faces for engaging opposite sides of bolt blanks, said cooperating forming dies being located in a horizontal plane above the horizontal plane of the thread-forming dies, means for feeding bolt blanks to said forming dies and means for feeding bolt blanks from said forming dies to said threading dies.

33. A machine for threading bolt blanks which comprises a pair of stationary dies, a pair of reciprocating dies, common means for reciprocating said reciprocating dies, one of said stationary dies and one of said reciprocating dies being forming dies cooperating one with the other and shaped to impart a generally concaved contour to those portions of the bolt blanks which are to be threaded, the other of said stationary dies and the other of said reciprocating dies cooperating one with the other and having thread-forming faces for engaging opposite sides of bolt blanks, the cooperating forming dies being located in a horizontal plane above the horizontal plane of the thread-forming dies, means for feeding bolt blanks to said forming dies, and means for causing bolt blanks from said forming dies to pass by gravity to the thread-forming dies.

34. A machine for threading bolt blanks which comprises a pair of relatively reciprocable rolling dies adapted simultaneously to engage opposite sides of the shank of a bolt blank to be threaded and roll it preparatory to receiving a thread, a pair of relatively reciprocable thread-rolling dies disposed in tandem with said first pair of dies, said thread rolling dies being positioned simultaneously to engage opposite sides of a rolled blank from said first pair of dies, and means for feeding shaped and formed blanks from said first pair of dies to said thread-rolling dies, including a starting pusher for engaging a rolled blank and initially pushing it to a position between the thread-rolling dies.

35. A machine for threading bolt blanks which comprises a pair of relatively reciprocable platen rolling dies adapted simultaneously to engage opposite sides of the shank of a bolt blank to be threaded and roll it, a pair of threading platen rolling dies disposed in tandem with said first pair of dies, said threading dies being positioned simultaneously to engage opposite sides of a rolled blank from said first pair of dies, means for feeding rolled blanks from said first pair of dies to said threading dies, and means for reciprocating the threading dies relatively to develop a thread on a rolled blank disposed between them.

36. A machine for threading bolt blanks which comprises a pair of relatively reciprocable platen dies adapted simultaneously to engage opposite sides of a shank of a bolt blank to be threaded and shape it to size and form to receive a thread, a pair of threading platen dies having coacting thread-producing surfaces thereon and disposed in tandem with said first pair of dies, said threading dies being positioned simultaneously to engage opposite sides of a shaped and formed blank from said first pair of dies, and means for feeding shaped and formed blanks from said first pair of dies to said second pair of dies, said feeding means including a feed chute and a flapper bar operable independently of said dies.

37. A machine for threading bolt blanks which comprises a pair of stationary dies, a pair of reciprocating dies, common means for reciprocating said reciprocating dies, one of said stationary dies and one of said reciprocating dies being forming dies simultaneously engageable with opposite sides of the shank of a bolt blank to be threaded to shape it to size and form to receive a thread, the other of said stationary dies and the other of said reciprocating dies being threading dies simultaneously engageable with opposite sides of the shank of a shaped and formed blank to impart a thread thereto, and means for feeding shaped and formed bolt blanks from said forming dies to said threading dies.

38. A machine for threading bolt blanks which comprises a pair of stationary dies, a pair of reciprocating dies, common means for reciprocating said reciprocating dies, one of said stationary dies and one of said reciprocating dies being forming dies simultaneously engageable with opposite sides of the shank of a bolt blank to be threaded to shape it to size and form to receive a thread, the other of said stationary dies and the other of said reciprocating dies being threading dies simultaneously engageable with opposite sides of the shank of a shaped and formed blank to impart a thread thereto, and means for feeding shaped and formed bolt blanks from said forming dies to said threading dies, said feeding means including a flapper bar operable to feed bolt blanks from the forming dies to the threading dies.

39. In a thread-rolling machine, a pair of relatively reciprocable form-rolling dies, a pair of relatively reciprocable thread-rolling dies, driving means for affecting relative reciprocation of each of said pairs of dies once during each cycle of operation of the machine, means for feeding a blank to said form-rolling dies once during each cycle of operation of the machine, and means for feeding a blank shaped by said form-rolling dies during a preceding operation to position between the thread-rolling dies once during each cycle of operation of the machine, whereby during each cycle of operation of the machine a blank is rolled to shape and a previously shaped blank has a thread rolled in it.

40. In a thread-rolling machine, two pairs of reciprocating-rolling dies, one of said pairs of dies having smooth working faces and the other having threading grooves formed on their working faces, driving means for affecting relative reciprocation of each of said pairs of dies once during each cycle of the machine, means for feeding a blank into position between said smooth-faced pair of dies once during each cycle of operation of the machine, and means for feeding into position between said other pairs of dies once during each cycle of operation of the machine, a blank rolled betwen said smooth-faced dies during a preceding cycle of operation of the machine.

41. In a thread-rolling machine, two pairs of relatively reciprocable rolling dies, driving means for affecting relative reciprocation of each of said pairs of dies once during each cycle of operation of the machine, means for feeding a blank into position between one of said pairs of dies once during each cycle of operation of the machine, and separate means for transferring a blank from said one pair of dies into position between the other of said pairs of dies once during each cycle of operation of the machine.

42. In a thread-rolling machine, a supporting frame, a crank shaft journaled in said frame, two pairs of relatively reciprocable rolling dies, each of said pairs including a stationary die carried by said frame and a reciprocating die spaced from and movable parallel with its cooperating stationary die, driving means connecting each of said reciprocating dies with said crank shaft, means for feeding a blank to one said pairs of dies at the beginning of the relative reciprocatory movement of said one pair of dies from one dead center, and means for transferring a blank acted on by said one pair of dies and feeding the same to the other of said pairs of dies at the beginning of the relative reciprocatory movement of said other pair of dies from said one dead center.

43. In a thread-rolling machine, a frame, two pairs of relatively reciprocable platen rolling dies supported by said frame, the working faces of all of said dies being substantially parallel, each of said pairs of dies being adapted to engage the opposite sides of a blank and roll the same from a starting position to a discharge position, the discharge position of one of said pairs of dies being spaced transversely from the starting position of the other of said pairs of dies, and means for transferring blanks from the discharge position of said one pair of dies to the starting position of the other of said pairs of dies.

44. A machine for making threaded bolts comprising a pair of form-rolling dies arranged substantially horizontally and adapted simultaneously to engage opposite sides of the shank of a bolt blank, means for reciprocating the said dies relatively to shape the bolt blank preparatory to receiving a thread, a pair of thread-rolling dies disposed substantially horizontally at a different level than the forming dies and extending beyond them, said threading dies having coacting thread-producing surfaces thereon and being positioned simultaneously to engage opposite sides of a shaped blank from the forming dies, means for feeding shaped blanks from the forming dies to the threading dies, and means for reciprocating the threading dies relatively to develop a thread on a shaped blank disposed between them.

45. A machine for making threaded bolts comprising a pair of form-rolling dies arranged substantially horizontally and adapted simultaneously to engage opposite sides of the shank of a bolt blank, a pair of thread-rolling dies disposed substantially horizontally at a lower level than the forming dies and extending beyond them and having coacting thread-producing surfaces upon their adjacent faces, means for simultaneously reciprocating one of the forming dies and one of the threading dies, means for introducing a bolt blank between the forming dies to be formed by the reciprocation of one of the forming dies and simultaneously conveyed to a transfer position, and separate means for transferring a formed blank from said transfer position to the threading dies, whereupon the reciprocatory movement of one of the threading dies operates to produce a thread in the formed blank and simultaneously to convey the threaded bolt to a discharge position.

WILLIAM H. BAILEY.